Benj Arnold's Improved Twist Drill

118178

PATENTED AUG 22 1871

Witnesses.

Jas E Arnold

H. A. Arnold

Inventor

Benjamin Arnold

UNITED STATES PATENT OFFICE.

BENJAMIN ARNOLD, OF EAST GREENWICH, RHODE ISLAND.

IMPROVEMENT IN TWIST-DRILLS.

Specification forming part of Letters Patent No. 118,178, dated August 22, 1871.

*To all whom it may concern:*

Be it known that I, BENJAMIN ARNOLD, of East Greenwich, in the county of Kent and State of Rhode Island, have invented certain new and useful Improvements in Twist-Drills, of which the following is a specification:

This invention consists in making three slots in the shank of the drill, equidistant from each other and parallel to the axis of the drill, to fit the jaws of the self-centering chucks now in general use for holding them.

Figure 1:
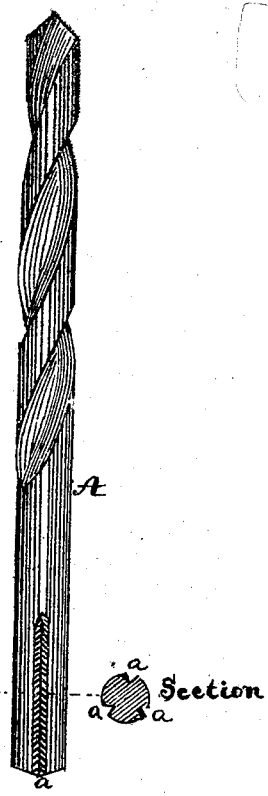
Figure 2:
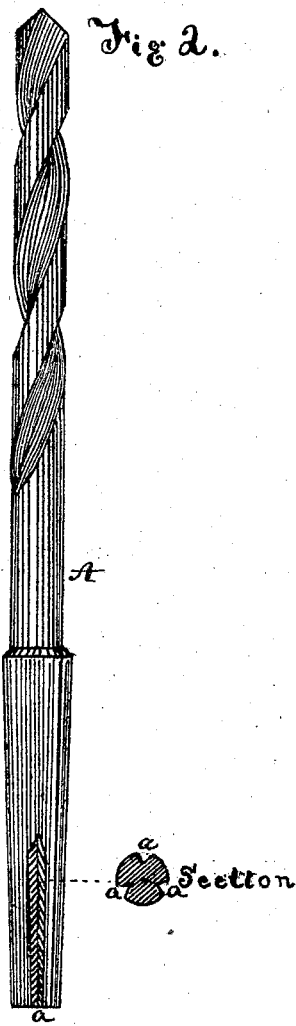

Figure 1 is a side view of a straight-shanked twist-drill, with a view of a section of the same. Fig. 2 shows a side view of a taper-shanked twist-drill, with a section of the same.

A is the body of the drill. $a$ $a$ $a$ represent the slots in the shank, these slots being made at equal distance from each other, and in a line parallel to the center line or axis of the drill. These slots perform a very important service in using the drills, as they insure a firm hold of the jaws of the chuck which enters into them upon the drill without requiring the chuck to be screwed up hard with a wrench, as is otherwise necessary, and which causes more injury and wear to the chuck than all other causes combined; and the strain of the wrench is apt to throw or work the chuck out of true with the center of the lathe-mandrel, thereby increasing the breakage of drills and causing inaccuracy of work and loss of time in taking up and using the wrench, and oftentimes being obliged to stop the lathe and take the wrench and tighten the chuck because the drill slips. Another point is that the jaws of the chuck bringing up against the ends of the slots will prevent the drill from sliding into the chuck, as it often does in drilling steel, &c., until the hardened part of the drill enters the jaws of the chuck, and then, slipping around the edges of the spirals, (being hard,) wear away the edges of the jaws and spoil the chuck for holding small drills; and in the taper-shanked drill the slots, being cut straight in parallel to the line of the center, enable the workman to use it, a straight-jawed chuck, without straining the outer ends of the jaws, while another person may be using the socket to which the drill belongs in another machine.

The saving of time in the constant use of the slotted drill is great, as it is only necessary for the workman to insert the drill into the chuck and turn it up lightly by hand, and it will hold the drill against any strain that it will bear and not break, and it is as easily removed.

What I claim as my invention is—

A twist-drill, with slots or grooves made in its shank, substantially as herein set forth, as a new article of manufacture.

BENJAMIN ARNOLD.

Witnesses:
 JAS. E. ARNOLD,
 FRANK H. ARNOLD.